United States Patent
Ko et al.

(10) Patent No.: US 11,101,457 B2
(45) Date of Patent: Aug. 24, 2021

(54) MANUFACTURING METHOD FOR CATHODE ACTIVE MATERIAL COMPLEX, AND LITHIUM SECONDARY BATTERY INCLUDING THE CATHODE ACTIVE MATERIAL COMPLEX

(71) Applicant: KOREA BASIC SCIENCE INSTITUTE, Daejeon (KR)

(72) Inventors: You Na Ko, Daejeon (KR); Hae Jin Kim, Daejeon (KR); Won Gi Hong, Daejeon (KR); Jin Bae Lee, Daejeon (KR)

(73) Assignee: KOREA BASIC SCIENCE INSTITUTE, Daejeon (KR)

(*) Notice: Subject to any disclaimer, the term of this patent is extended or adjusted under 35 U.S.C. 154(b) by 188 days.

(21) Appl. No.: 16/182,954

(22) Filed: Nov. 7, 2018

(65) Prior Publication Data
US 2019/0140263 A1 May 9, 2019

(30) Foreign Application Priority Data
Nov. 8, 2017 (KR) .................. 10-2017-0147933

(51) Int. Cl.
| H01M 4/36 | (2006.01) |
| H01M 4/587 | (2010.01) |
| H01M 4/58 | (2010.01) |
| H01M 4/02 | (2006.01) |

(52) U.S. Cl.
CPC ........... *H01M 4/364* (2013.01); *H01M 4/36* (2013.01); *H01M 4/587* (2013.01); *H01M 4/5825* (2013.01); *H01M 2004/028* (2013.01)

(58) Field of Classification Search
CPC ...... H01M 4/364; H01M 4/36; H01M 4/5825; H01M 4/587; H01M 2004/028
See application file for complete search history.

(56) References Cited

U.S. PATENT DOCUMENTS

| 5,948,483 A * | 9/1999 | Kim .................. B05B 5/004 |
| | | 427/483 |
| 2011/0159372 A1 * | 6/2011 | Zhamu ................. H01G 11/50 |
| | | 429/232 |
| 2012/0058397 A1 * | 3/2012 | Zhamu ................. H01M 4/13 |
| | | 429/231.8 |
| 2013/0197256 A1 * | 8/2013 | Wu .................... B82Y 40/00 |
| | | 558/56 |

FOREIGN PATENT DOCUMENTS

| CN | 102969505 A | * | 3/2013 |
| CN | 107658469 A | * | 2/2018 |
| KR | 20130107928 A | | 10/2013 |

OTHER PUBLICATIONS

Illakkiya et al., "Nebulized spray pyrolysis: a new method for synthesis of graphene film and their characteristics", Surface & Coatings Technology 307 (2016) pp. 65-72, available online Aug. 20, 2016 (Year: 2016).*
EPO website (www.espacenet.com) machine translation of CN107658469A (Year: 2018).*
EPO website (www.espacenet.com) machine translation of CN 102969505A (Year: 2013).*
Graphene modified LiFePO4 cathode materials for high power lithium ion batteries (Published on Jan. 24, 2011).
Core—Shell LiFePO4Carbon-Coated Reduced Graphene Oxide Hybrids for High-Power Lithium-Ion Battery Cathodes (Published on Nov. 27, 2014).

* cited by examiner

*Primary Examiner* — Gregg Cantelmo
(74) *Attorney, Agent, or Firm* — Porzio Bromberg & Newman P.C.

(57) ABSTRACT

The present disclosure provides a process for the production of a cathode active material complex which is used for a lithium secondary battery, comprising the steps of: mixing a lithium metal phosphate with a solvent to prepare a first precursor; mixing the first precursor with a graphene oxide to prepare a second precursor solution; forming droplets from the second precursor solution; and making the droplets into a powder; wherein the formation of the powder is performed by spray pyrolysis method.

5 Claims, 12 Drawing Sheets

MANUFACTURING METHOD FOR CATHODE ACTIVE MATERIAL COMPLEX, AND LITHIUM SECONDARY BATTERY INCLUDING THE CATHODE ACTIVE MATERIAL COMPLEX

CROSS-REFERENCE TO RELATED APPLICATION(S)

This application claims the benefit under 35 U.S.C. 119(a) of Korean Patent Application No. 10-2017-0147933 filed on Nov. 8, 2017 in the Korean Intellectual Property Office, the entire disclosure of which is incorporated herein by reference for all purposes.

BACKGROUND

1. Field

The present disclosure relates to a process for the production of a cathode active material complex using spray pyrolysis method, and a lithium secondary battery comprising the same, preferably to a cathode active material complex having a specific shape, comprising $LiFePO_4$-rGO, and a secondary battery comprising the same.

2. Description of Related Art

Lithium secondary battery herein means a battery using lithium ions capable of carrying out its charging and discharging reversibly and repetitively. In the case of lithium ion battery, in general, intercalation of lithium ions occurs from an anode into a cathode at the time of discharge, whereas deintercalation of lithium ions happens deintercalated from the cathode and intercalated to the anode at the time of charge. The lithium ions intercalated into an electrode has charge neutrality with electrons entering the electrode through a collector and serves as a medium for storing electrical energy in the electrode.

Cathode active material useful for a lithium secondary battery is a material constituting a cathode of a lithium secondary battery and it generally has a lattice structure. Lithium contained in the cathode active material is deintercalated during the charging process and emits electrons through an external conductor. A transition metal(s) contained in the cathode active material is oxidized during the charging process. On the contrary, during the discharging process, lithium ions are intercalated into the lattice structure of the cathode active material and achieve charge neutrality with electrons transferred through the external conductor. When discharging, the transition metal is reduced. In order for intercalation and deintercalation of lithium to be reversible, it is required that the structure is not largely deformed even if lithium is intercalated into or deintercalated from the lattice structure constituting the cathode active material.

Representative examples of cathode active material for lithium secondary battery are $LiCoO_2$, $LiNi_{1-x}Co_xO_2$, $LiMn_2O_4$, $LiMn_{2-x}M_xO_4$, $LiNiO_2$, $LiFePO_4$, and so on. The lattice structure of cathode active material are largely classified into layer structure (e.g. $LiCoO_2$), spinel structure (e.g. $LiMn_2O_4$), inverse spinel structure (e.g. $LiNiVO_4$), and olivine structure (e.g. $LiFePO_4$). Among them, olivine structure is highly stable structure and also has high chemical stability. Especially, $LiFePO_4$ having an olivine structure is not only structurally stable but also thermally stable, and thus, it is highly likely to have a large volume and capacity, for example, hybrid electric vehicles and power tool batteries, and be exposed to external force and it may be applied as a power source for a product with a long operating time.

The olivine structure contains two octahedral sites that are crystallographically different from each other. Also, the two octahedra differ from each in their size. In the olivine structure, however, the two octahedra may form a regular structure with each other, and lithium ions can generally move through a one-dimensional path. Since the lithium ions are diffused through the one-dimensional path, cathode active material such as $LiFePO_4$ has an inherent problem that it is very vulnerable to defects.

In addition, $LiFePO_4$ is characterized by significantly lower electrical conductivity by having polyanion. This characteristic may lead to serious polarization during charging and discharging. Thus, an electro-conductive material may be added in order to use $LiFePO_4$ as a cathode active material. In spite of the addition of such electro-conductive material, however, there is a problem that storage capacity is significantly reduced when the electro-conductive material is not uniformly distributed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

As a solution to the above-mentioned problems, the present invention may provide a process for the production of a cathode active material complex using spray pyrolysis method, and a cathode active material complex having olivine structure which is used for a secondary battery and is produced in according with the above-mentioned process. More preferably, the present invention may provide a cathode active material complex which has a uniform size and shape and also has the electro-conductive material uniformly distributed, and a process of the production thereof.

In one general aspect, there is provided a process for the production of a cathode active material complex which is used for a lithium secondary battery, comprising the steps of: mixing a lithium metal phosphate with a solvent to prepare a first precursor; mixing the first precursor with a graphene oxide to prepare a second precursor solution; forming droplets from the second precursor solution; and making the droplets into a powder, wherein the formation of the powder is performed by spray pyrolysis method.

The process for the production of a cathode active complex useful for a lithium secondary battery may further comprise adding an acid to the second precursor solution between the preparation of the second precursor solution and the formation of the droplets. Also, the first precursor may contain metal ions, preferably the first precursor may be at least one selected from a group consisting of acetate, nitrate, chloride, hydroxide, carbonate and oxide of the metal(s).

The present disclosure also provides a cathode active material complex which is used for a lithium secondary battery, comprising graphene-lithium metal phosphate represented by following general formula (1), preferably the graphene-lithium metal phosphate has spherical particle shape, more preferably the particle has a diameter of submicron size or less. Provided, in the following general formula (1), M is at least one of metals selected from a group consisting of Mn, Fe, Co, and Ni.

$$LiMPO_4\text{-rGO} \tag{1}$$

In another aspect, there is provided a cathode active material complex comprising graphene-lithium metal phosphate in spherical particle shape; an anode active material; and an electrolyte.

In accordance with the present invention, the process for the production of a cathode active material complex using spray pyrolysis method may provide a cathode active material complex which has uniform size and shape, few defects in a lattice structure, and uniform distribution of an electro-conductive material.

The cathode active material complex obtained by the process according to the present invention, such as $LiMPO_4$-rGO or $LiFePO_4$-rGO, may retain constant storage capacity even when its charging and discharging are repeated.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

The present disclosure provides a process for synthesizing a cathode active material for lithium secondary battery, preferably a cathode active material having an olivine structure, more preferably a cathode active material having formula of $LiFePO_4$ so as to have uniform size and shape distribution. In addition, a process for synthesizing a complex having formula of $LiFePO_4$-rGO, as a cathode active material complex having improved electrical conductivity, by way of uniformly adding an electro-conductive material to the $LiFePO_4$ is provided in accordance with the present invention.

In order to provide the above-mentioned process and battery, the present invention uses a spray pyrolysis method. The spray pyrolysis method means series of process comprising: making a precursor solution into droplets, evaporating a solvent and then, discomposing the precursor to prepare particles and so on. The main steps in the spray pyrolysis method are largely divided into: 1) preparing a solution and a precursor; 2) producing droplets; and 3) forming powder. Each of steps will be explained in detail below.

1) Preparation of Solution and Precursor

The preparation of a solution and a precursor refers to adding metal salt(s) to a solvent to prepare the solution and the precursor which is used for dropletization. In particular, in accordance with the present invention, steps of mixing a lithium metal phosphate precursor with a solvent to prepare a first precursor solution and mixing the first precursor solution with graphene oxide to prepare a second precursor solution are carried out ahead.

More particularly, as the solvent, distilled water, organic solvent such as alcohol, ionic liquids (ILs), etc., may be used. Also, the metal salts may be acetate, nitrate, chloride, hydroxide, hydrate, carbonate, sulfate, or oxide thereof, which are easily dissolvable.

In the present disclosure, in case that an active material to be prepared through the dropletization of the metal salt(s) is a cathode active material, at least one selected from a group consisting of Fe, Mn, Co, Ni, Mn, Al, V and Cr may be used as a metal constituting the metal salt(s). Preferably, the metal salt(s) may include salt(s) of at least one metal selected from a group consisting of Fe, Mn, Co and Ni.

The solvent usable in the present invention is not particularly limited as long as it can dissolve the metal salt easily and can be applied to a gas phase process such as a spray pyrolysis method. For example, mixture of distilled water and alcohol can be used as a solvent.

In addition, the step of preparing the second precursor may further comprise adding an acid thereto. It is enough if the acid can help uniform distribution of graphene in the second precursor solution and can be removed by heat treatment as a chelating agent. Organic acid such as formic acid, citric acid, malic acid, fumaric acid, and maleic acid may be used.

The conductive material in the present invention is not limited as long as it contains a carbon-based compound. For example, carbon nanotube (CNT), graphite, super P, graphene, oxides or mixture(s) thereof may be used as a conductive material. The carbon-based compound in the oxide form is reduced by heating-treatment. Preferably, it is possible to synthesize a cathode active material complex of $LiFePO_4$-rGO having a conductive material uniformly by way of using graphene oxide.

2) Formation of Droplet

It is important to form droplets in determining the productivity of the spray pyrolysis method and the size distribution of particles. A variety of methods may be used for the formation of droplets. In particular, there are a method of simultaneously spraying gas and liquid with a nozzle, a method of spraying droplets by applying a voltage to a spray nozzle, and a method of preparing droplets by using ultrasonic wave.

The method of spraying gas and liquid simultaneously using a nozzle is not easy to control particle formation and size distribution since the size distribution is larger than that of other methods.

In the method of spraying gas and liquid simultaneously with a nozzle, it is not easy to control particle formation and size distribution since the size distribution is larger than that of other methods. An electrostatic atomization method in which a voltage is applied to a nozzle to spray can form small particles of less than micron, but productivity and practicality are low. On the contrary, the method of using ultrasonic wave enables several micron-sized droplets, relatively narrow size distribution, and adoption of mass production.

Therefore, the method of preparing droplets using ultrasonic wave is used in the present disclosure, but the method of preparing droplets in the present disclosure is not limited to the method of using ultrasonic wave above, and it is also possible to prepare droplets in several steps by selecting the plurality of methods or by combining the above methods. In addition to the above methods, a method of preparing droplets by supplying inertia force which that can overcome the surface tension of the liquid to liquid may be adopted.

3) Preparation of Powder

In order to obtain particles, for example, a cathode active material from droplets, it is necessary to evaporate a solvent and decompose a precursor. Said process is mainly carried out in a reactor and the droplets use a gas to move to the reactor, and there is no particular limitation to the gas. For example, air, hydrogen, nitrogen, and so on may be used as a carrier gas.

An energy required to evaporate the solvent and decompose the precursor is supplied to the reactor. As a method of supplying energy, a method of heating using an electric furnace, a method of heating using a laser, a flame, plasma, and so on may be used, and the present invention is not limited by the aforementioned methods.

The step of heating droplets also affects the shape of particles and size distribution. For example, particles obtained through common spray pyrolysis methods are spherical. A cathode active material complex comprising graphene-lithium metal phosphate according to the present invention is preferably spherical particles. When the shape of the cathode active material complex is broken, it is difficult to fill the electrode when forming it, and the movement of the lithium ions may be limited by metal ions.

Furthermore, particles obtained by heating the droplets may be often porous or hollow, which is generally caused by concentration gradient of solute in the droplet during the volatilization of the solvent. It is important to provide sufficient time for the solute to diffuse in the droplet in order to prevent selective precipitation of supersaturated solute.

The temperature of the reactor may be 100° C. or more and 800° C. or less. This is because water which is most commonly used as a solvent is not vaporized at a temperature of less than 100° C., and the operation of the reactor becomes problematic when it is 800° C. or more.

When considering the above, in the present disclosure, the shape and size of the cathode active material complex may be varied not only by differing the ratio of the metal salt and the electro-conductive material but also by adjusting various parameters, such as method of forming droplets, temperature of the carrier gas, flow rate of the carrier gas, pressure of the nozzle, temperature of the reactor, and time to stop droplets.

The present disclosure may prepare a cathode active material complex having a diameter of several tens of nanometers or more to several tens of micrometers or less. Preferably, the diameter of the cathode active material complex may be 400 nm or more and 10 μm or less.

In addition, in the preparation method according to the present disclosure, heat energy is supplied in the step of preparing powder, but post-heating treatment is not performed separately. The post-heating treatment is generally a step of additionally heating the powder to make a product uniform. However, when particles are synthesized by ordinary spraying processes, particles with hollow may be obtained, and the particles with hollow experience crystal growth during the post-heating treatment process and thus lose spherical shape and have irregular appearance. A part of the surface of particles with hollow may be destroyed going through the post-heating treatment in some cases.

In particular, when the uniformity of Fe distribution serves an important role in the development of the function of the cathode active material, such as $FePO_4$, such problems that particles with hollow are formed or the particles with hollow lose spherical shape during the post-heating treatment are crucial factors that may lead to loss of function. Thus, it is an advantage of the present disclosure that a cathode active material complex capable of exhibiting a certain function can be obtained without requiring a separate firing step.

Hereinafter, embodiments of the present disclosure will be described in detail with reference to the drawings. It is understood that embodiments of the present disclosure may be modified into various forms and the scope of the present disclosure is not limited to the drawings and the embodiments below, but is determined only by what is described in the claims.

Figure 1A:
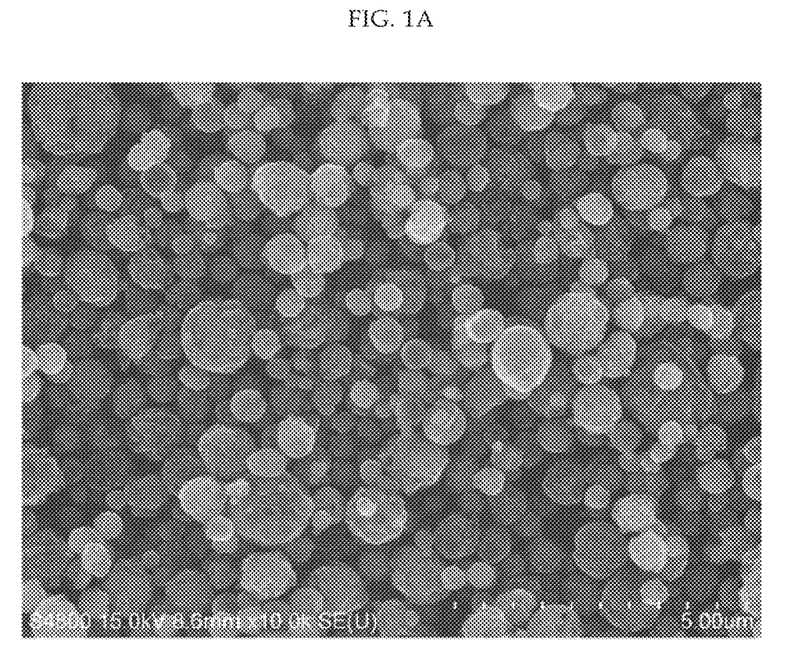
FIGS. 1A to 1B show SEM and TEM photographs of a cathode active material complex obtained by the process according to the present disclosure, respectively.
Figure 1B:
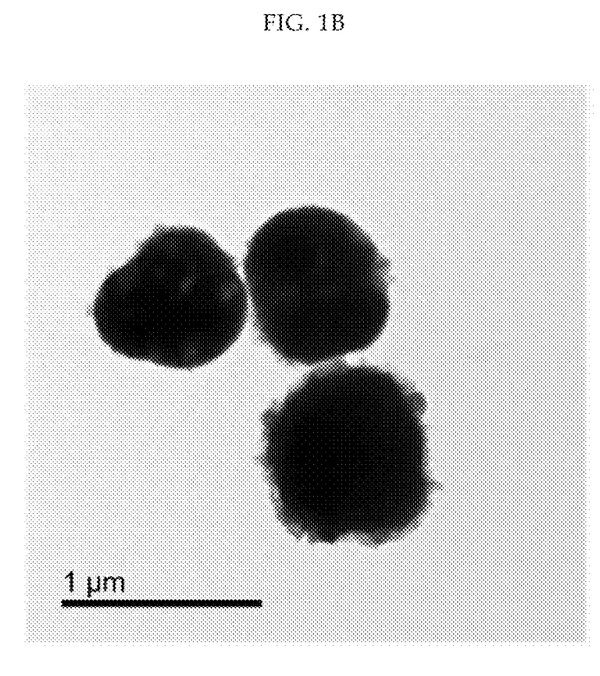

FIGS. 1A to 1B are views of a cathode active material complex obtained by the preparation method according to the present disclosure using SEM and TEM. The chemical formula of the cathode active material complex shown in FIGS. 1A to 1B is $LiFePO_4$-rGO. It is important that a post-heating treatment was not performed to the cathode active material complex before the SEM and the TEM were taken, contrary to common cases.

As shown in FIG. 1A, the diameter of the cathode active material complex is about 1 μm or less, and it is seen that the complex has a relatively uniform diameter distribution. However, it has been already described that the cathode active material complex having diameter of 1 μm or more can be synthesized by varying reaction conditions. In addition, it is seen that although the post-heating treatment is not performed, the external shape is not porous, and most particles of the cathode active material complex maintain a spherical shape without defects.

FIG. 1B is an enlarged TEM image of a cathode active material complex having a diameter of about 1 μm among various cathode active material complexes. The black color indicates particles of the cathode active material complex, and translucent gray portion on the surface of the particle of the cathode active material complex indicates an electro-conductive material. Referring to FIG. 1B, it is seen that the electro-conductive material is distributed over the entire surface of the particle of the cathode active material.

FIGS. 2A to 2E show the distribution of a metal and carbon ions contained in the cathode active material complex using EDS. The EDS stands for Energy Dispersive Spectrometer, and it is a device that can directly observe the distribution of) atoms contained in a sample. FIGS. 2A to 2E show how uniformly Fe, P, O, and C which are elements constituting a cathode active material complex are distributes in particles of the cathode active material complex.

Figure 2A:
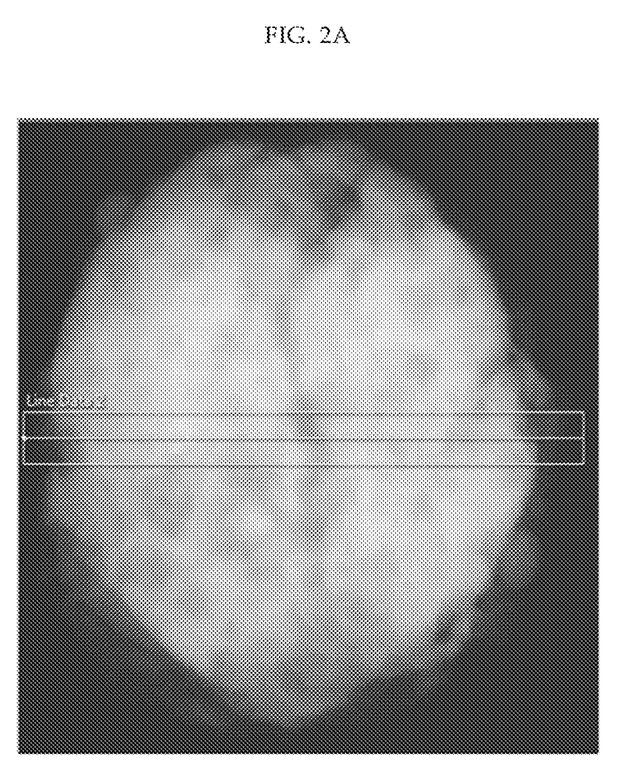
FIGS. 2A to 2E show the distribution of a metal and carbon ions contained in the cathode active material complex with EDS.

FIG. 2A is a TEM photograph of particles of a cathode active material complex that is a standard for EDS analysis. The white portion indicates the particles of the cathode active material complex. FIG. 2 shows the distribution of Fe located on the surface of the cathode active material complex; FIG. 2C shows the distribution of P located on the surface of the cathode active material complex; FIG. 2D shows the distribution of O located on the surface of the cathode active material complex; and FIG. 2E shows the distribution of C located on the surface of the cathode active material complex.

Figure 2B:
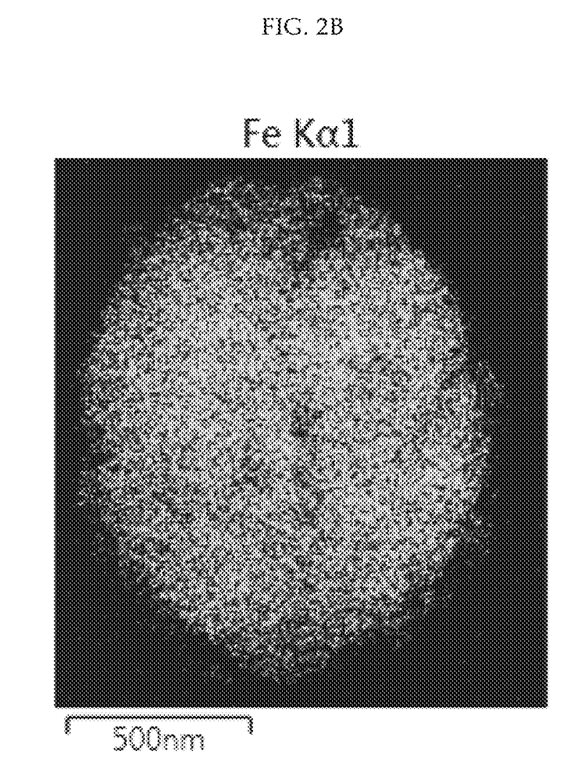
Figure 2C:
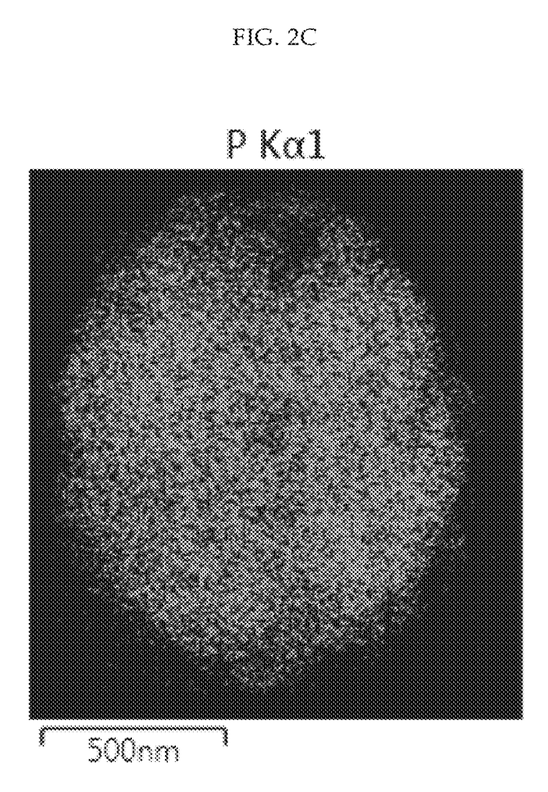
Figure 2D:
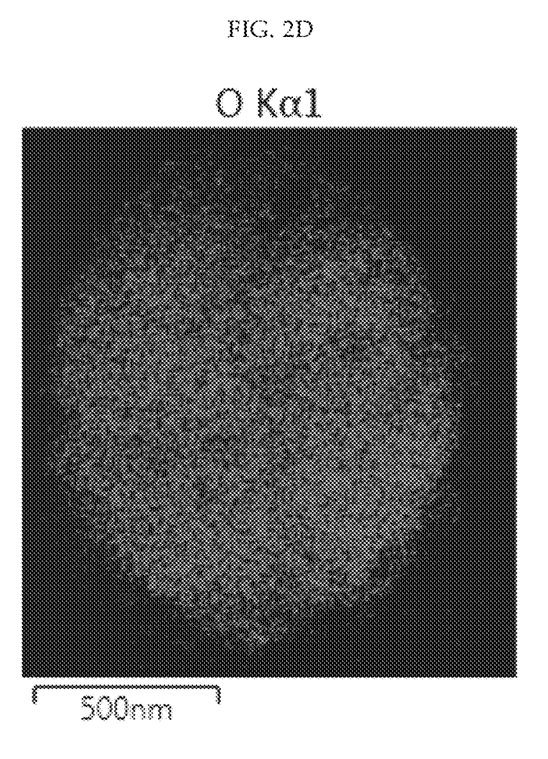
Figure 2E:
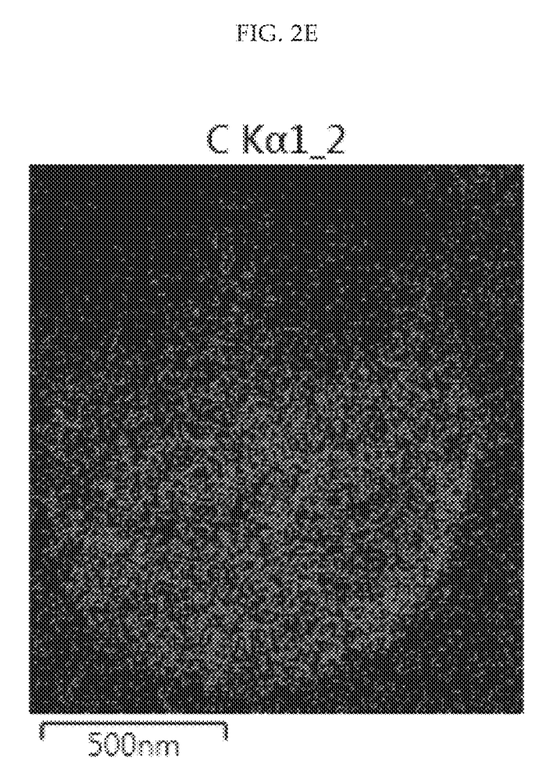

The uniform distribution of FIG. 2B means that the $LiFePO_4$-rGO obtained by the preparation method of the present disclosure well forms and maintains an olivine structure without post-heating treatment for the cathode active material. In addition, since carbon contained in the cathode active material complex is mostly derived from an electro-conductive material, it can be determined that the distribution shown in FIG. 2E is close to the distribution of the electro-conductive material contained in the cathode active material complex. Since $LiFePO_4$ contained in the cathode active material complex has a lattice structure and the distribution of the electro-conductive material is uniform, it is presumed that a cathode active material complex having excellent electrical conductivity and maintaining a storage capacity constant even when charge and discharge are repeated is synthesized, as desired by the present disclosure.

Figure 3A:
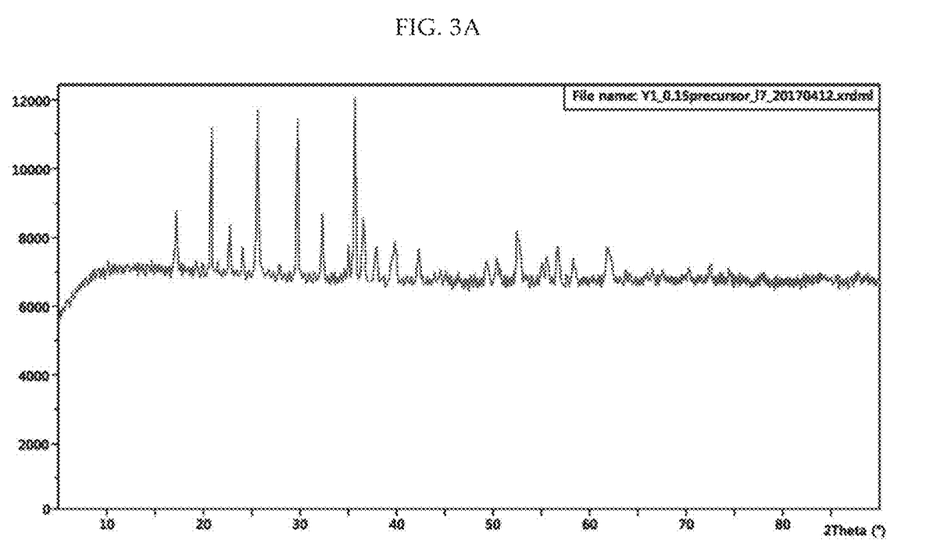
FIGS. 3A to 3B show a comparison of XRD results of a cathode active material complex before the post-heating treatment with those of a cathode active material complex obtained after the post-heating treatment.
Figure 3B:
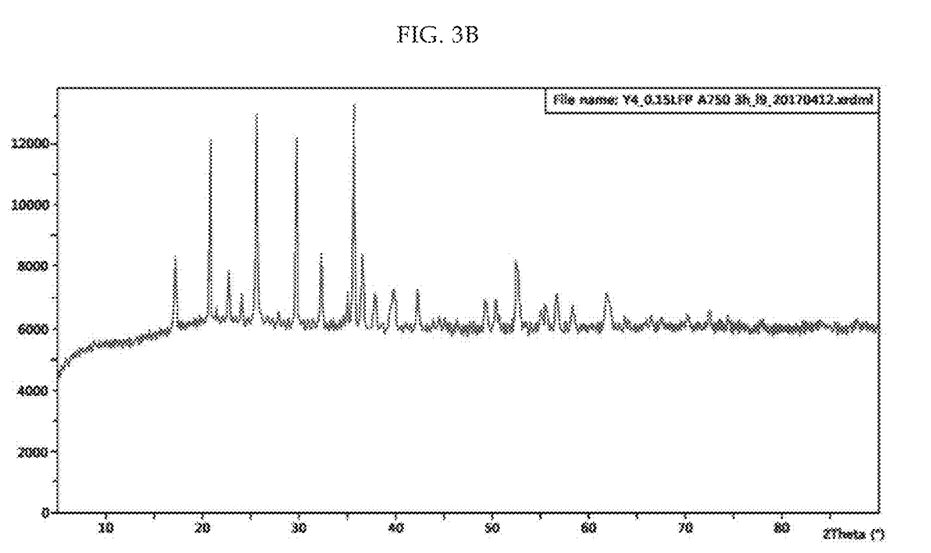

FIGS. 3A and 3B show a comparison of XRD results of a cathode active material complex before the post-heating treatment and a cathode active material complex obtained after the post-heating treatment. FIG. 3A illustrates an XRD result of a cathode active material complex obtained by the preparation method of the present disclosure. FIG. 3B illustrates an XRD result of performing a post-heating treatment to the active material complex obtained by the preparation method of the present disclosure.

The similar peaks of the graphs of FIGS. 3A and 3B indicate that crystal structure of the particles did not change as a result of post-heating treatment. Further, it can be seen that the preparation method of the present disclosure synthesized a cathode active material complex that can display a desired function without performing a post-heating treatment.

Figure 4A:
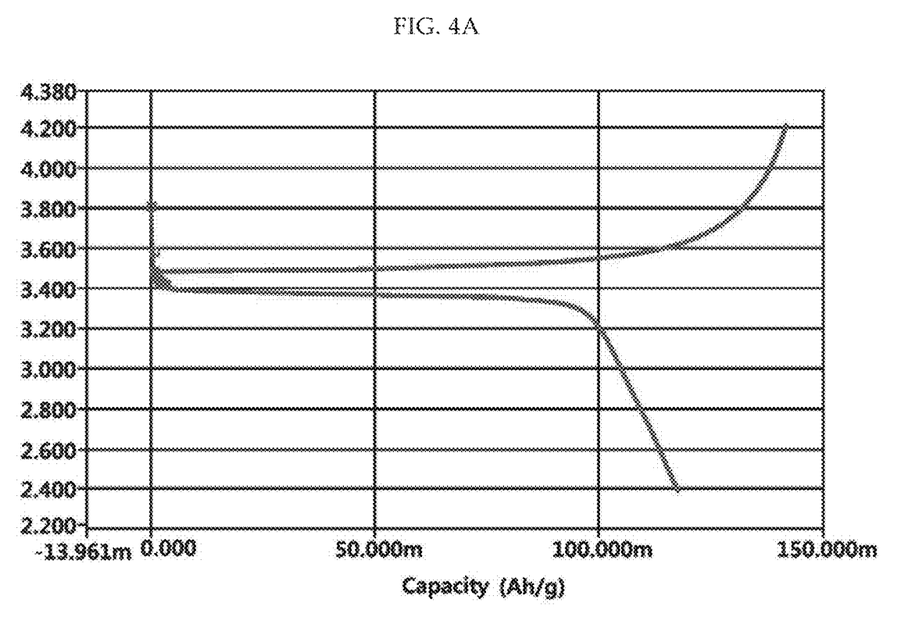
FIGS. 4A to 4B illustrate charge and discharge patterns of a battery according to the present disclosure.
Figure 4B:
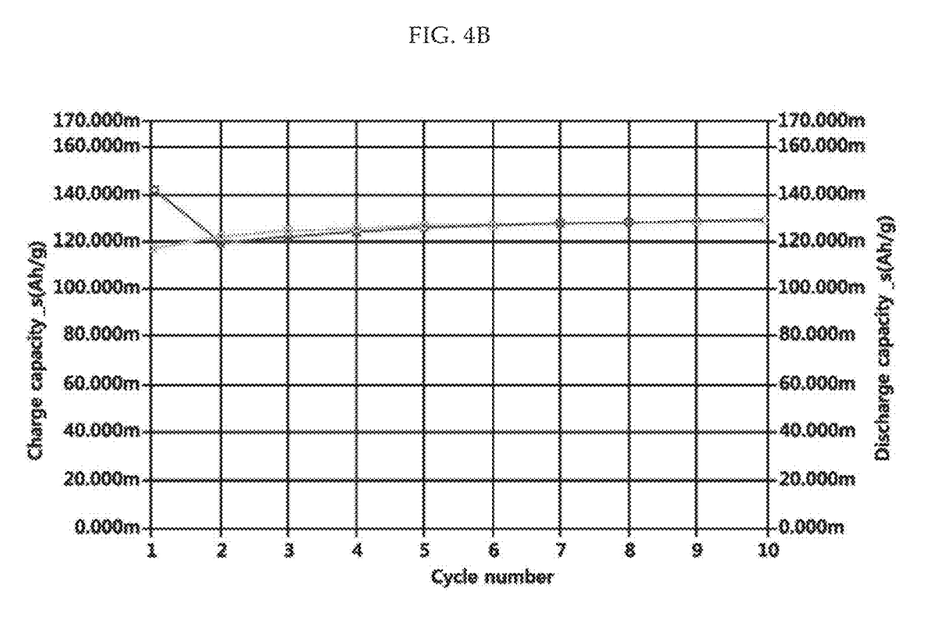

FIGS. 4A and 4B illustrate charge and discharge patterns of a battery of the present disclosure. FIG. 4A shows a potential change of a lithium secondary battery during first charging and discharging of the lithium secondary battery where the cathode active material complex obtained from the process of the present invention is applied after performing the post-heating treatment. FIG. 4B shows a change in the charging capacity when the lithium secondary battery is repeatedly charged and discharged. The electrode was made by coating on aluminum foil with slurry obtained mixing an active material, an electro-conductive material (that is, super P), and a binder in amount of 70 wt % to 15 wt % to 15 wt %, respectively, and a 2032-type coin cell was made and data of FIGS. 4A and 4B was obtained. The voltage was 2.4 V or more to 4.2 V or less, and the current rate was constant at 1 C (170 mA/g).

FIG. 4A shows a smooth development, and a pattern in which a voltage is greatly changed and a pattern in which a voltage is kept constant. Regarding the pattern where the voltage is greatly changed, it is inferred to be inserted and desorbed into FePO4 by the diffusion of the lithium ions, and regarding the pattern where the voltage is uniformly maintained, it is inferred that a phase boundary is shifted by the phase transition on the interface of the $FePO_4$. The two patterns above are appropriate to the two modes of delivery of lithium ions in a conventional olivine structure. Therefore, it is inferred that LiFePO4 which is a cathode active material has a regular olivine structure as predicted theoretically.

FIG. 4B shows a change in the charging capacity of the secondary battery when charging and discharging are repeated. The dark line indicates charge capacity and the bright line indicates capacity. As the cycle number is repeated, it can be seen that charge and discharge capacities converge to a constant value. It is a charge and discharge graph that shows the characteristics of $LiFePO_4$ with excellent lifetime. In other words, FIGS. 4A and 4B are also indicators that the olivine structure of the cathode active material is well formed.

Figure 5A:
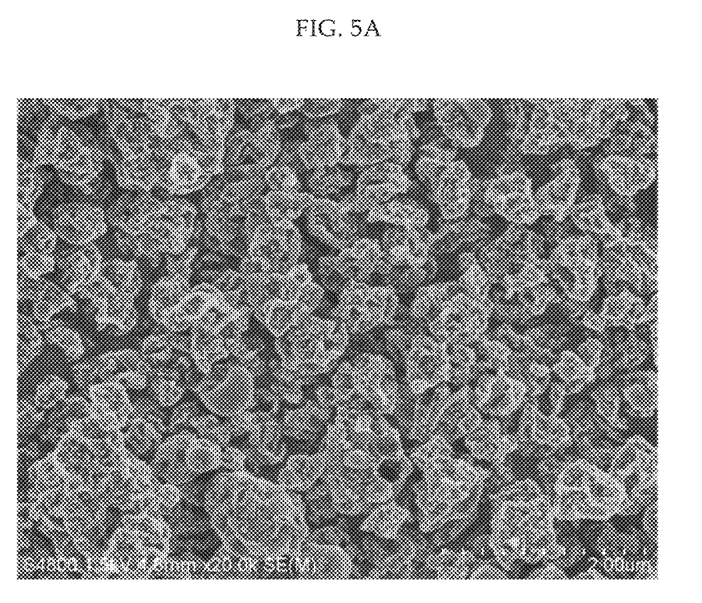
FIGS. 5A to 5C show differences when differing the concentrations of a metal salt and a graphene oxide with the SEM.
Figure 5B:
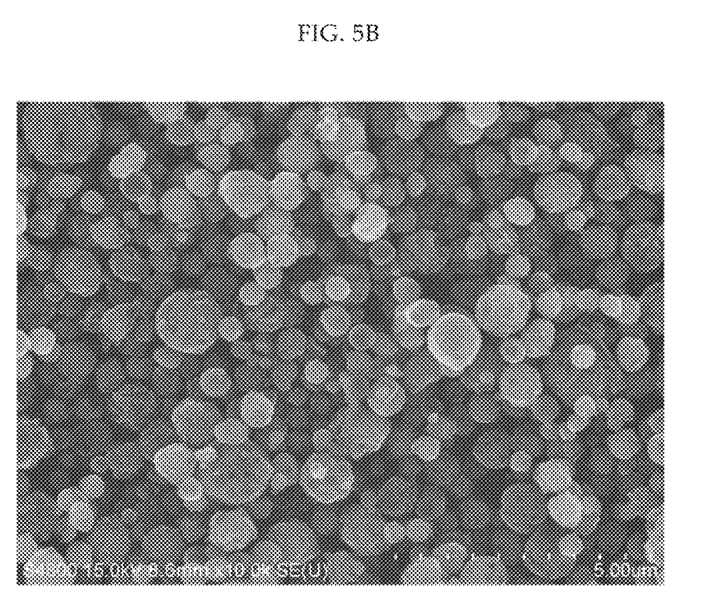
Figure 5C:
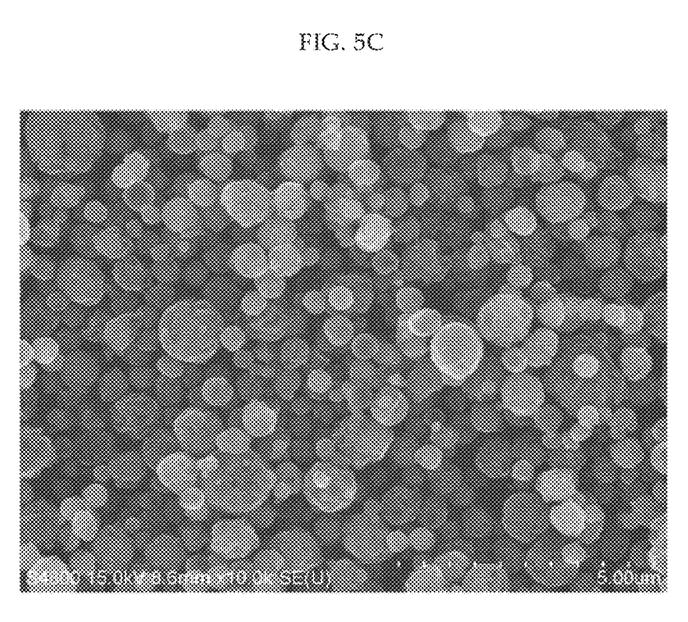

FIGS. 5A to 5C show differences when differing the concentrations of a metal salt and a graphene oxide by using the SEM. The concentrations of graphene oxide are the same. The concentration of LiFePO4 in FIG. 5A was 0.05 M; the concentration of LiFePO4 in FIG. 5B was 0.15 M; and the concentration of $LiFePO_4$ in FIG. 5C was 0.45 M. Considering that spherical particles are generally easier to produce without influence of concentration, it can be inferred that the concentration of graphene oxide is relatively too high to obtain a spherical cathode active material complex. On the other hand, in FIGS. 5B and 5C, it can be seen that a uniform spherical cathode active material complex is obtained. In particular, as the concentration of $LiFePO_4$ increases, the average size of a diameter of the cathode active material complex increases.

Hereinafter, a more detailed embodiment will be described.

EXAMPLE

Example 1

A Cathode Active Material Complex in Which the Concentration of $LiFePO_4$ is 0.15 M and Post-Heating Treatment was not Conducted 1) Preparation of Precursor Solution Lithium nitrate, iron nitrate, and ammonium dihydrogen phosphate are dissolved in distilled water. At this time, a first precursor solution is prepared by adding an appropriate stoichiometric amount such that the total concentration of a metal is 0.15 M.

A second precursor solution (spray solution) is prepared by mixing 20 ml of a solution in which graphene oxide is dispersed in the first precursor solution. The graphene oxide was prepared by oxidizing graphite having a size of 14 μm by a modified Hummers method, and the graphene oxide contained 0.4 g in total.

2) Spray Pyrolysis Method

The spray solution was dropletized using ultrasonic humidifier. 5% $H_2/Ar(g)$ was flowed at a rate of 1.5 L/min to transport droplets to a reactor. Also, the temperature of the reactor was kept constant at 700° C.

Comparative Example 1

A Cathode Active Material Complex Where Concentration of LiFePO4 is 0.15 M and Post-Heating Treatment was Performed Everything was prepared in the same manner as in Example 1 except that a post-heating treatment was performed to a cathode active material complex obtained as a result of the spray pyrolysis method. The post-heating treatment was carried out under the atmosphere of $N_2$ gas and the temperature of 750° C. for 3 hours.

[Evaluation]

Figure 6:
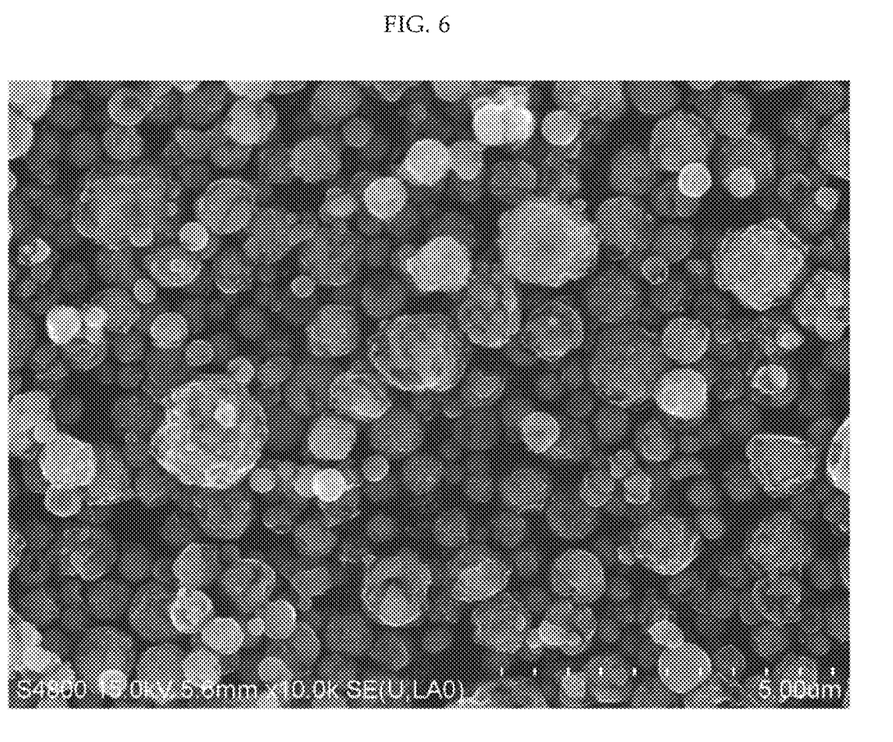
FIG. 6 show a SEM image of a cathode active material complex additionally going through a post-heating treatment.

FIG. 6 is a SEM image of a cathode active material complex additionally going through a post-heating treatment. Referring to FIG. 6, it can be seen that the shape of the cathode active material complex in the post-heating treatment process is largely unchanged as compared with that before the post-heat treatment. This means that the preparation method of the present disclosure is a method that can obtain a spherical uniform cathode active material in spite of not performing the post-heating treatment.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A process for the production of a cathode active material complex which is used for a lithium secondary battery, comprising the steps of:
   mixing a lithium metal phosphate with a solvent to prepare a first precursor;
   mixing the first precursor with a graphene oxide to prepare a second precursor solution;
   forming droplets from the second precursor solution; and making the droplets into a powder;
   wherein the formation of the powder is performed by spray pyrolysis method in a reactor at a temperature of between 100° C. and 800° C. and particles of the cathode material complex have hollow shape, wherein a concentration of the first precursor is 0.15 M to 0.45 M.

2. The process of claim 1, further comprising adding an acid to the second precursor solution between the preparation of the second precursor solution and the formation of the droplets.

3. The process of claim 1, wherein the first precursor is at least one selected from a group consisting of acetate, nitrate, chloride, hydroxide, carbonate and oxide which contain metal(s).

4. The process of claim 1 wherein the droplets are formed by using an ultrasonic wave.

5. The process of claim 1 wherein droplets are formed by supplying inertia force that can overcome surface tension of the second precursor solution.

* * * * *